United States Patent
Parekh et al.

(10) Patent No.: US 9,015,810 B2
(45) Date of Patent: Apr. 21, 2015

(54) SYSTEM AND METHOD FOR AUTHENTICATING MANUAL INTERACTION IN A COMPUTING ENVIRONMENT

(71) Applicant: Tata Consultancy Services Limited, Mumbai, Maharashtra (IN)

(72) Inventors: Gaurang Rajnikant Parekh, Maharashtra (IN); Nawaz Mohammed Shaikh, Maharashtra (IN)

(73) Assignee: Tata Consultancy Services Limited (IN)

( * ) Notice: Subject to any disclaimer, the term of this patent is extended or adjusted under 35 U.S.C. 154(b) by 104 days.

(21) Appl. No.: 13/652,496

(22) Filed: Oct. 16, 2012

(65) Prior Publication Data

US 2014/0059659 A1    Feb. 27, 2014

(30) Foreign Application Priority Data

Aug. 23, 2012  (IN) .......................... 2450/MUM/2012

(51) Int. Cl.
*G06F 7/04*     (2006.01)
*G06F 15/16*    (2006.01)
*G06F 17/30*    (2006.01)
*H04L 29/06*    (2006.01)
*G06F 21/40*    (2013.01)
*G06F 21/36*    (2013.01)
*G06F 21/31*    (2013.01)

(52) U.S. Cl.
CPC ................ *G06F 21/40* (2013.01); *G06F 21/36* (2013.01); *G06F 21/31* (2013.01); *G06F 2221/2133* (2013.01)

(58) Field of Classification Search
CPC .. G06F 21/31; G06F 21/36; G06F 2221/2133

USPC ......................................................... 726/5, 4
See application file for complete search history.

(56) References Cited

U.S. PATENT DOCUMENTS

| | | | |
|---|---|---|---|
| 7,266,693 B1 * | 9/2007 | Potter et al. .................... | 713/169 |
| 2007/0005500 A1 * | 1/2007 | Steeves et al. .................. | 705/51 |
| 2009/0232351 A1 | 9/2009 | Kagitani | |
| 2011/0191820 A1 | 8/2011 | Ivey | |
| 2011/0225634 A1 | 9/2011 | Pai | |
| 2012/0297190 A1 * | 11/2012 | Shen et al. ..................... | 713/168 |
| 2013/0124425 A1 * | 5/2013 | Agrawal ......................... | 705/75 |

FOREIGN PATENT DOCUMENTS

WO     2005062775 A2     7/2005

OTHER PUBLICATIONS

Longe et al. "Checking Internet masquerading using multiple CAPTCHA challenge-response systems" Adaptive Science & Technology. 2009. pp. 244-249.

(Continued)

*Primary Examiner* — Linglan Edwards
*Assistant Examiner* — Forrest Carey
(74) *Attorney, Agent, or Firm* — Merchant & Gould P.C.

(57) ABSTRACT

The present invention relates to a system and method for providing a secure manual interaction with one or more electronic devices in a network. An authentication module generates an authentication task to a user to input data using a user interface. The data is processed and a second security module generates security tasks to be responded by the user such that the security tasks are generated in real-time by using the input data fed by the user. A verification module correlates the input data with the security tasks responded by the user in order to check the data integrity before completing the interaction.

6 Claims, 4 Drawing Sheets

(56) References Cited

OTHER PUBLICATIONS

Tanvee et al. "Move & Select: 2-Layer CAPTCHA Based on Cognitive Psychology for Securing Web Services" Intl. J. of Video & Image Processing & Network Security. vol. 11. No. 5. 2011. pp. 9-17.

Chew. "Automatically distinguishing humans from machines in an online environment" Doctorial Dissertation. Univ. of CA Berkeley. 2004.

Wen-Hung Liao. "A Captcha Mechanism by Exchange Image Blocks" Pattern Recognition. 2006. pp. 1179-1183.

Cui et al. "A 3-layer Dynamic CAPTCHA Implementation" Education Technology & Computer Science. vol. 1. 2010. pp. 23-26.

\* cited by examiner

Join the points in the above image

Match the above animal with its name

CAPTCHA

This question is for testing whether your are a human visitor and to prevent automated spam submissions What code is in the image?

Enter the character (without spaces) shown in the image

SYSTEM AND METHOD FOR AUTHENTICATING MANUAL INTERACTION IN A COMPUTING ENVIRONMENT

This application claims benefit of Serial No. 2450/MUM/2012, filed 23 Aug. 2012 in India and which application is incorporated herein by reference. To the extent appropriate, a claim of priority is made to the above disclosed application.

FIELD OF INVENTION

The present invention relates to an authentication system for authenticating a manual interaction in a network. More particularly, the invention relates to a system and method for providing secure manual interaction by authenticating user's identity.

BACKGROUND OF THE INVENTION

With increase in use of World Wide Web for accessing information, lot of security concerns are associated with a user who is accessing the information. Internet bots perform repetitive tasks to access particular website or information from a webpage and the internet bots are usually used for malicious purpose. Therefore, authenticating a user interaction by generating random authentication tasks has become a common practice.

In order to distinguish between a human user and automated computer accessing information, generally Completely Automated Public Turing test to tell Computers and Humans Apart (CAPTCHA) are used so that humans can respond to the CAPTCHA test and access the information. In general, the CAPTCHA tests are designed in such a way that computers can generate the test but computers will have difficulty in solving the test so that when correct answer is received, it is understood that human would have entered. Usually CAPTCHA test requires the user to read and enter the letters or digits from a distorted image which appears on screen to pass the test which gives access to a website or a webpage.

Currently all the CAPTCHA generation techniques are random in nature and they assist in accessing the information on a webpage by human and not by automated internet bot. The problem associated with the current practice is that they do not provide any assurance over data integrity once the CAPTCHA test is passed. Further, weak algorithms which are being used to generate CAPTCHA test gives hint on hacking the next pattern.

Although the currently available CAPTCHA tests provide security to some extent, at times, they are too complex for a user to read which results in bad user experience.

Another problem associated with the currently available CAPTCHA test generation is that CAPTCHA services that are used are from third party sources. If the third party services are down then the user cannot access the information on the webpage.

Therefore, there is a need of an authentication system and method which is capable of generating such authentication tasks by which a user could be easily differentiated from a machine. The system should also checks for data integrity by using strong algorithm. Further, generating authentication test should produce unique pattern which is easy to read by the user.

OBJECTS OF THE INVENTION

It is the primary object of the present invention to provide a system and method for a secure manual interaction with one or more electronic device in a network.

It is another object of the invention to generate secure authentication tasks in real-time by using the information provided by the user for data integrity.

It is yet another object of the invention to generate secured authentication tasks of unique patterns having letters, words, symbols or a combination of all which are easy to read by the user.

SUMMARY OF THE INVENTION

The present invention provides a system for a secure manual interaction with one or more electronic device in a network. The system comprises a user interface configured to receive one or more input data from a user, requesting for an interaction with the electronic device. The system further comprises an authentication module configured to generate an authentication task to be performed by the user at a time when the user is feeding the input data, for first authentication of the user in order to restrict an automatic software performing action. The system further comprises a processing means configured to process the input data fed by the user, when the user is identified after the first authentication. The processing means further comprises a security module configured to generate one or more security task to be responded by the user for a second authentication such that the security tasks are generated in real-time by using the input data fed by the user. The system for providing secure manual interaction further comprises a verification module configured to correlate the input data with the security tasks thus responded by the user in order to check the data integrity before completing the interaction.

The present invention also provides a method for providing a secure manual interaction with one or more electronic device in a network. The method comprises steps of receiving one or more input data from a user requesting for an interaction with the electronic device. The method further comprises steps of authenticating first time the user by generating an authentication task to be performed by the user at a time when the user is feeding the input data in order to restrict an automatic software performing action. The method further comprises steps of processing the input data fed by the user when the user is identified after the first authentication. The processing further comprises of authenticating second time by generating one or more security task to be responded by the user, such that the security tasks are generated in real-time by using the input data fed by the user. The method further comprises steps of checking the data integrity by correlating the input data with the security tasks thus responded by the user before completion of the interaction.

BRIEF DESCRIPTION OF DRAWINGS

Further objects, embodiments, features and advantages of the present invention will become more apparent and may be better understood when read together with the detailed description and the accompanied drawings. The components of the figures are not necessarily to scales, emphasis instead being placed on better illustration of the underlying principle of the subject matter. Different numeral references on figures designate corresponding elements throughout different views. However, the manner in which the above depicted features, aspects, and advantages of the present subject matter are accomplished, does not limit the scope of the subject matter, for the subject matter may admit to other equally effective embodiments.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

The present invention relates to a system and method for providing a secure manual interaction with one or more electronic devices in a network. The system and method proposes a two-layer process of security in order to provide a more secured interaction. An authentication module generates an authentication task to be performed by one or more user requesting for initiating the interaction with the electronic device. The data thus fed by the user is processed for security tasks to be responded by the user in a second security layer. These security tasks are generated in real-time by using the input data fed by the user. These security tasks are performed by the user which not only provide a more secured interaction but also checks the data integrity before completing the interaction.

Figure 1:
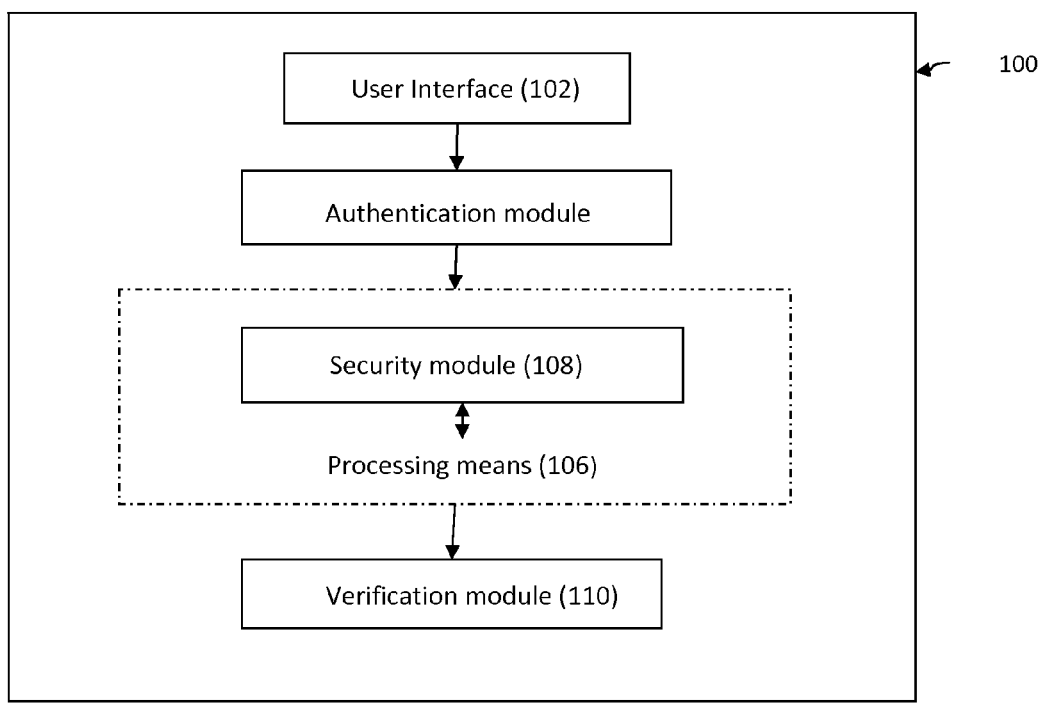
FIG. 1 illustrates the system architecture for providing a secure manual interaction with one or more electronic device in a network.

In accordance with an embodiment, referring to FIG. 1, the system (100) comprises of a user interface (102) configured to initiate an interaction of one or more users with the electronic device, an authentication module (104) configured to authenticate the user, a processing means (106) configured to process the data provided by the user in order to check the data integrity and to provide a more secured interaction. The processor further comprises of a security module (108) configured to generate one or more security task in real-time. The system further comprises of a verification module (110) configured to check the data integrity before completing the interaction.

Still referring to FIG. 1 the system (100) comprises of user interface (102) configured to receive the input data from the user requesting for an interaction with the electronic device (not shown in figure). The interaction with the electronic device may include but is not limited to performing a transaction, filling a form for one or more utility purpose etc. By way of specific example, the user may initiate an interaction for recharging his mobile phone. For this the user interface (102) may allow the user to feed his personal details (like name, email id etc) in a machine generated form.

Figure 2:
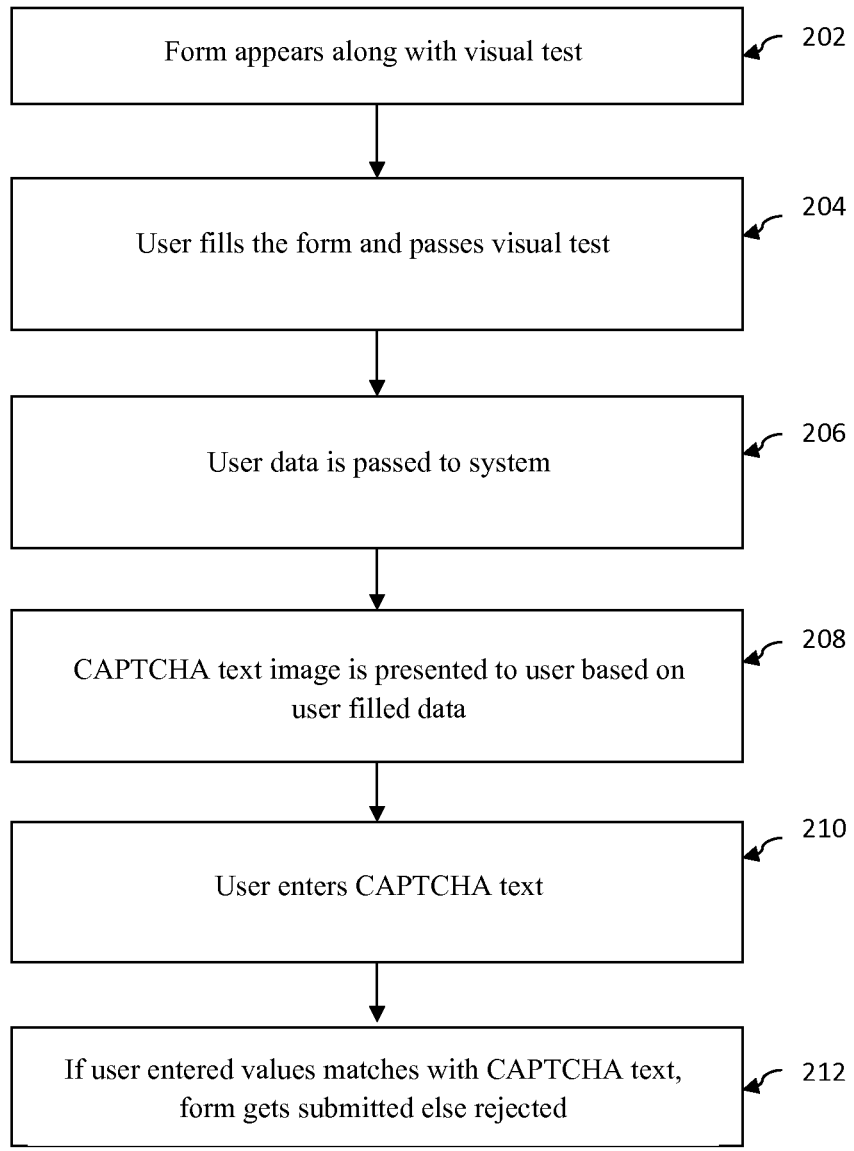
FIG. 2 illustrates the process flow for providing a secure manual interaction with one or more electronic device in a network in accordance with an alternate embodiment of the invention.

Once the interaction is started, the user provides all the details in the form of input data. Along with these inputs (for example, a form), the user is authenticated first time after responding to one or more authentication tasks. Referring to FIG. 1 and FIG. 2, for this first authentication, the system (100) comprises of the authentication module (104) configured to generate one or more authentication task to be performed by the user at a time when the user is feeding the input data in order to restrict an automatic software performing action. These authentication tasks are generated for preset number of times. For example, the authentication task to be performed by the user may include a visual test. The user may be asked to identify an image of a cat. If in a first attempt, the user is unable to identify it correctly, the authentication module (104) may generate this visual test for preset number of times (say 3). If the user is not able to pass the generated visual test for this preset number of times, the interaction is rejected by the system (100).

In the first step, the visual test appears along with the form which is to be filled by the user. On successfully completing the test, the form freezes.

When the user is identified after the first authentication step, the system (100) starts a second authentication based on the information fed by the user (filled in the form). Referring to FIG. 1, for the second authentication, the system (100) further comprises of the processing means (106) configured to process the input data fed by the user when the user is identified after the first authentication. The processing means (106) further comprises of the security module (108) configured to generate one or more security task to be responded by the user for the second authentication such that the security tasks are generated in real-time by using the input data fed by the user. The security tasks which the user has to respond may include but is not limited to a CAPTCHA text.

The security module (108) further comprises of a mixer, a XOR GATE (tree), an image generator and an encrypting module (not shown in figure). The user inputted data is passed to the processing means (106). The processing means (106) generates random 128 bit primary number. Further the primary number and the user inputted data is passed to the mixer in binary format. The mixer combines 128 bit randomly generated primary number with the user data. The XOR tree generates CAPTCHA text from the output obtained from the mixer and key of binary value is obtained. The key thus obtained is converted to hexadecimal which is CAPTCHA text. The CAPTCHA text attained is passed to the image generator to generate a CAPTCHA image. The CAPTCHA image thus generated is displayed on form and the CAPTCHA text is set in hidden field of form. Further, 128 bit primary number is also set in hidden field after encrypting with public key.

The system (100) further comprises of the verification module (110) configured to correlate the input data with the security tasks thus responded by the user in order to check the data integrity before completing the interaction. The system (100) accepts the completion of interaction if the input data is matched with the tasks thus responded by the user else rejects based on the output provided by the verification module (110).

In accordance with another embodiment of the present invention, referring to FIG. 2, when the interaction gets started, a form appears along with the visual test (as shown in step 202) which comprises of objects and necessary description related to that particular object for its identification. The visual test may not be limited to identifying objects with their description or characteristics, it may include swiping of the line or any given text in given direction. The user fills the form by filling the details requested by the system (100) in order to pass the visual test (as shown in step 204). The visual test according to the present invention is first layer of security for authenticating the user and restricting automatic software performing actions. On successfully completing the visual test the form gets freezes.

The user data is then passed to the processor (as shown in step 206) for further processing and starting a process of second authentication. In order to provide the more secure interaction, the CAPTCHA text image is generated which is to be performed by the user (as shown in step 208). The generation of CAPTCHA is based on the data inputted by the user in the form. The CAPTCHA image generation and to be responded by the user (as shown in step 208) according to the invention is a second layer of security. User enters the CAPTCHA text (as shown in step 210) as presented in the CAPTCHA text image. Form gets submitted if user entered values matches with the CAPTCHA text image else form gets rejected. The CAPTCHA text may include but not limited to digits, alphanumeric characters and combination of digits etc.

BEST MODE/EXAMPLE FOR WORKING OF THE INVENTION

Figure 3:
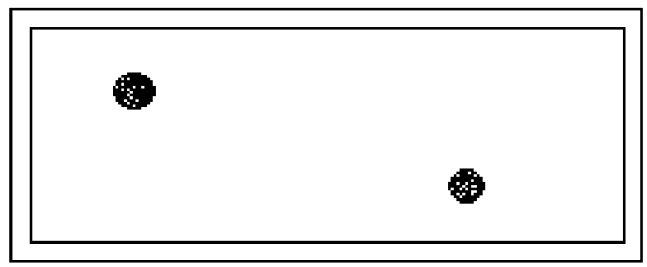
FIG. 3 illustrates the security tasks by way of generating a visual test in accordance with an exemplary embodiment of the invention.
Figure 3:

The system and method illustrated to provide a secure manual interaction with one or more electronic device may be illustrated by working example stated in the following paragraph; the process is not restricted to the said example only:

Referring to FIG. 3, when a user imitates a session of interaction with an electronic device, in the very first step, a form appears along with the visual test (identification of an animal image) which comprises of objects and identifying the necessary description related to that particular object. The visual test may be presented as shown in FIG. 3. The visual test presented to the user is the first layer of security and may ask user to join the points in the image displayed on the screen. Further, in another embodiment, the visual test may comprise image (for example cat) with an object and relative description of the object which the user needs to identify by choosing the right description. The user submits the form after filling the relevant information (for example user's name, address, contact number etc) and the form gets freeze.

The user inputted data is then passed to the processor. The system generates random 128 bit primary number. Further the primary number and the user inputted data is passed to the mixer in binary format. The mixer combines 128 bit randomly generated primary number with the user data. The XOR tree generates CAPTCHA text from the output obtained from the mixer and key of binary value is obtained.
Step 1: Data (output of Mixer)
Step 2: Generating XOR tree

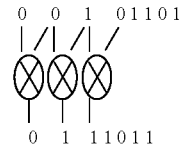

wherein ⊗ is an XOR operation

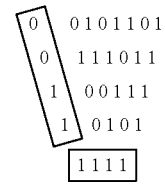

Step 3: Key generation
Key=code 1 ⊗ code 2
Step 4: CAPTCHA text generation
CAPTCHA text=hexadecimal value of key The key thus obtained is converted to hexadecimal which is CAPTCHA text. The CAPTCHA text attained is passed to the image generator to generate a CAPTCHA image. The CAPTCHA image thus generated is displayed on form and the CAPTCHA text is set in hidden field of form. Further, 128 bit primary number is also set in hidden field after encrypting with public key.

Figure 4:
FIG. 4 illustrates the generation of security tasks based on user's information in accordance with an exemplary embodiment of the invention.

The CAPTCHA text image thus generate may be presented to the user as shown in FIG. 4. The CAPTCHA text image is presented to the user as the second layer of security where user has to enter the text displaying on the CAPTCHA image. The CAPTCHA text image presented to the user may comprise alphabets, alphanumeric, combination of digits and the CAPTCHA text may include case sensitive characters which the user need to enter to submit the form.

If the text typed by the user matches with the CAPTCHA, the interaction of the user gets completed for example, request for mobile recharge gets done else it gets rejected. Based upon wrong entry of CAPTCHA text, the system may allow the user to enter the text for a preset number of times.

We claim:
1. A system for providing a secure interaction of a user with an electronic device, the system comprising:
   a memory; and
   a processor coupled to the memory to execute programmed instructions stored in the memory to:
      receive user data from the user requesting for an interaction with the electronic device;
      generate an authentication task to be performed by the user at a time when the user is feeding the user data;
      mix the user data and a 128 bit primary random number using a mixer to generate a mixer output;
      XOR the mixer output to generate a hexadecimal CAPTCHA text;
      generate a CAPTCHA image by passing the hexadecimal CAPTCHA text through an image generator based upon the user data and the 128 bit primary random number, wherein the CAPTCHA image is presented to the user for further authentication;

receive a response from the user against the CAPTCHA image; and verify the response provided by the user in order to allow the user to interact with the electronic device.

2. The system as claimed in claim 1, wherein the interaction comprises at least one of performing a transaction and filling a form for one or more utility purposes.

3. The system as claimed in claim 1, wherein the authentication task is a visual test to be performed by the user.

4. A method for providing a secure interaction of a user with an electronic device, the method comprising steps of:

receiving user data from the user requesting for an interaction with the electronic device;

generating an authentication task to be performed by the user at a time when the user is feeding the user data;

mixing the user data and a 128 bit primary random number using a mixer to generate a mixer output;

XORing the mixer output to generate a hexadecimal CAPTCHA text;

generating a CAPTCHA image by passing the hexadecimal CAPTCHA text through an image generator based upon the user data and the 128 bit primary random number, wherein the CAPTCHA image is presented to the user for further authentication;

receiving a response from the user against the CAPTCHA image; and verifying the response provided by the user in order to allow the user to interact with the electronic device.

5. The method as claimed in claim 4, wherein the interaction comprises at least one of performing a transaction and filling a form for one or more utility purposes.

6. The method as claimed in claim 4, wherein the authentication task is a visual test to be performed by the user.

* * * * *